No. 773,465. PATENTED OCT. 25, 1904.
C. BORG.
METHOD OF MANUFACTURING METAL WHEELS.
APPLICATION FILED APR. 18, 1904.
NO MODEL. 2 SHEETS—SHEET 1.
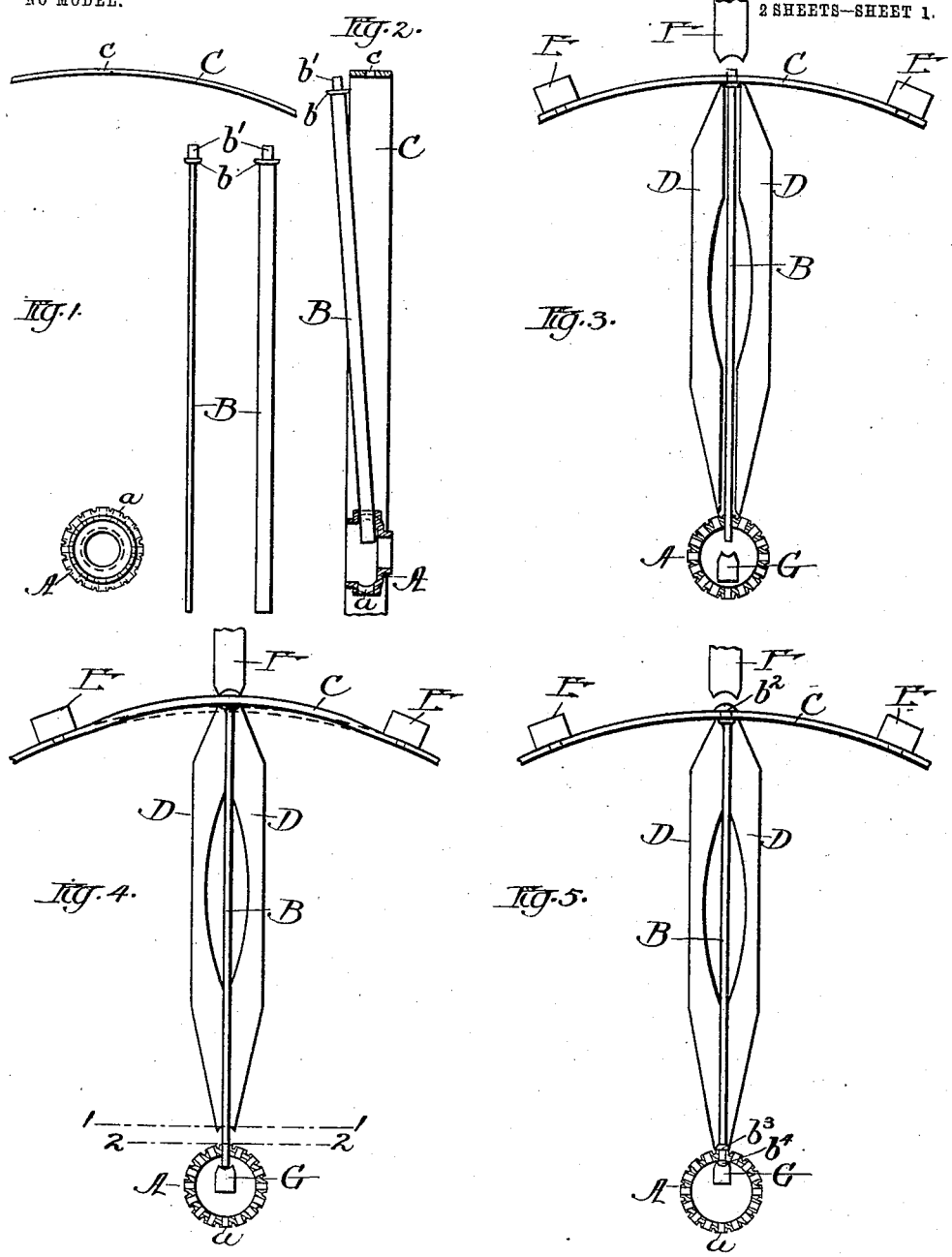

No. 773,465. PATENTED OCT. 25, 1904.
C. BORG.
METHOD OF MANUFACTURING METAL WHEELS.
APPLICATION FILED APR. 18, 1904.
NO MODEL. 2 SHEETS—SHEET 2.
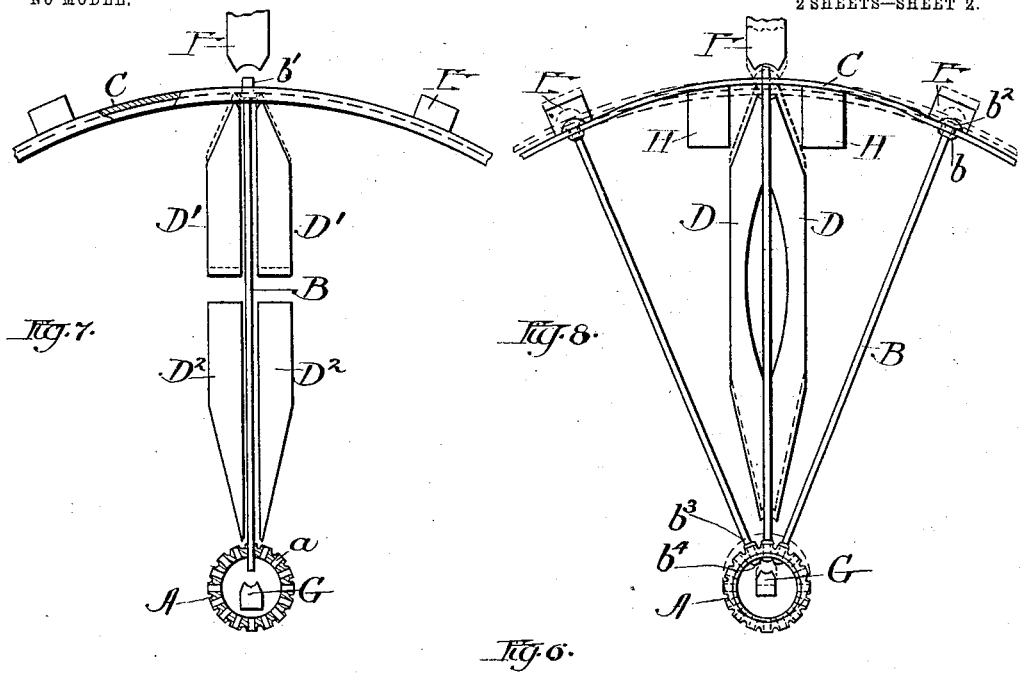
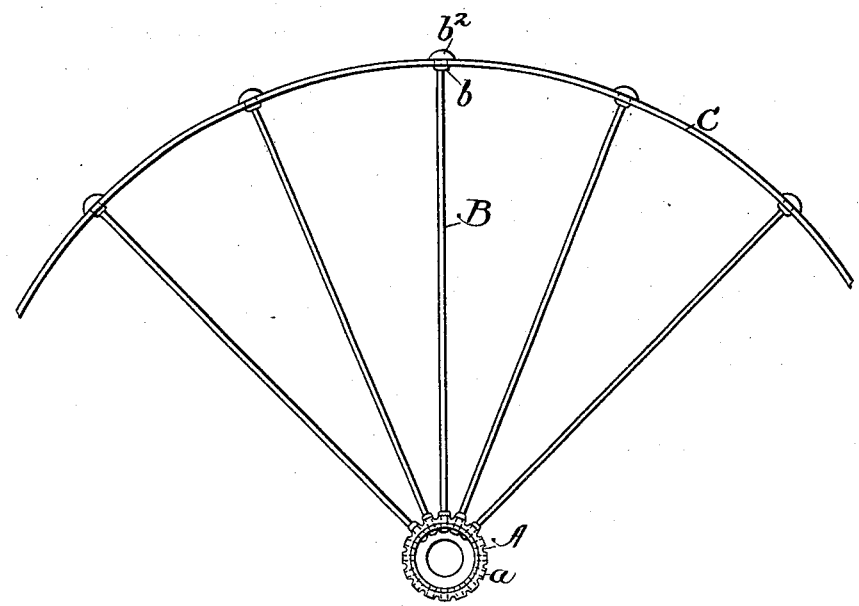
Witnesses:
J. N. Daggett.
T. H. Hyde.
Inventor.
Chris Borg.
By J. C. Warnes,
Attorney.

No. 773,465.

Patented October 25, 1904.

UNITED STATES PATENT OFFICE.

CHRIS BORG, OF CHICAGO, ILLINOIS, ASSIGNOR TO INTERNATIONAL HARVESTER COMPANY, A CORPORATION OF NEW JERSEY.

METHOD OF MANUFACTURING METAL WHEELS.

SPECIFICATION forming part of Letters Patent No. 773,465, dated October 25, 1904.

Application filed April 18, 1904. Serial No. 203,590. (No model.)

*To all whom it may concern:*

Be it known that I, CHRIS BORG, a citizen of the United States, residing at Chicago, in the county of Cook and State of Illinois, have invented a new and Improved Method of Manufacturing Metal Wheels, of which the following is a complete specification.

In the methods heretofore employed in the manufacture of metal wheels it has been the common practice to unite the spokes to the rim and hub of the wheel by closing or welding the rim after the spokes have been secured thereto. In doing this, to avoid the consequent shortening of the spokes, the shoulders or flanges abutting the outside of the hub and the inside of the rim were either previously formed upon the spokes or "scraped up," so the length of the spokes would not be affected. Such a method of procedure is more or less objectionable, because, first, of the extra work required in upsetting the end of the blank for the spokes to provide stock for the scraped-up shoulders; secondly, if the spokes were not of a uniform length a perfectly circular contour of the wheel-rim could not be obtained, and, furthermore, a "tension-wheel" could not in this way be well produced without previously heating the spokes.

The invention herein set forth is designed to overcome such difficulties and to provide a method of manufacturing metal wheels in which all previous upsetting or forming of shoulders, flanges, or tenons upon the stroke may be dispensed with, in which the original length and structure of the spoke-body when once in place will not be disturbed, and in which a closed rim and a tension-wheel of a uniformly circular outline can be produced.

The method consists, essentially, in providing spoke-blanks of a length sufficient to afford stock for shoulders and heads when upset by means of which securement of the spoke to the rim and hub is effected and in order to effect such securement to spring a portion of the rim adjacent thereto outwardly beyond its normal position and then to return the sprung portion of the rim to its normal position and simultaneously therewith to complete the connection of the spoke with the hub and rim.

The adoption of this improved method of manufacturing metal wheels is of course conditioned upon the employment of a somewhat elastic rim, and hence is more applicable to the manufacture of wheels of a rather light construction and of a considerable diameter— such, for instance, as rake-wheels.

In the accompanying drawings, Figure 1 represents a side elevation of a hub, a fragment of the rim, and a spoke having a shoulder formed on the rim end thereof, the spoke being shown both in its edgewise and flatwise position. Fig. 2 is a partially transverse section of a hub and rim, illustrating the manner of inserting the spoke. Fig. 3 represents the spoke properly placed in relation to the other members of the wheel and the gripping-jaws in position ready for clamping the spoke and the heading-tools before engagement with the ends of the spoke. Fig. 4 shows the next step in which the spoke is secured to the rim and the rim sprung outwardly, the gripping-jaws having gripped the spoke and sprung the segment of the rim from the normal position shown in dotted lines in this figure to the position shown in full lines, the head having been formed on the outside of the rim by a suitable heading-tool. Fig. 5 shows the spoke and rim after having been returned to their normal position and simultaneous with such movement a shoulder having been formed without the hub and a head within the hub. Fig. 6 represents a portion of a wheel as it appears when complete. Fig. 7 illustrates the application of the improved method in securing the spoke to a wheel which is provided with laterally-disposed peripheral flanges, and Fig. 8 illustrates the application of the improved method of the securement of the spokes to the members of the wheel in which the spoke is first secured to the hub instead of to the tire.

In the application of this improved method the following members are provided, viz: A hub having holes or mortises uniformly spaced and in which the spokes are received, spokes, either plain or shouldered, at one end, preferably the latter, and a closed rim or a rim formed of a member the ends of which have been welded or otherwise united before the spokes have been inserted therein, the said rim being also provided with apertures for the reception of the spokes corresponding in number and disposition with those in the hub. These several parts are shown in Fig. 1, in which A designates the hub, and $a$ the mortises or holes therein. B represents a spoke of an oval cross-section, $b$ the shoulder previously formed on the outer end thereof, and $b'$ the tenon on the rim end of the spoke.

C designates a segment of the rim or tire. The spoke B is thrust into one of the openings in the hub until the outer end of the spoke comes within the curved plane touching the inside of the rim C, as shown in Fig. 2. The outer end of the spoke is then brought into alinement with the corresponding mortise $c$ in the rim C and the tenon $b'$ inserted therein. The next step in the operation is to grip the spoke adjacent to the shoulder $b$ with suitable means—such, for instance, as the coöperating jaws D shown in the several figures. In Fig. 3 these jaws are shown in position, but not gripped. In Fig. 4 the jaws D are gripped upon the spoke and moved outwardly, moving the spoke B and springing the adjacent portions of the tire outwardly, as shown in Fig. 4, the position of the supports E and E determining the length of the segment of the rim which is sprung outwardly. This segment consists, preferably, of an arc equal in length to a spoke-space on either side of the spoke being secured. A head $b^2$ is then formed on the outer end of the spoke, as shown in Fig. 5, the head being formed on the outside of the rim C by any suitable means—such, for instance, as the upsetting-die F.

The operation of springing the segment of the tire outwardly and the forming of a head upon the spoke outside the rim may be accomplished either simultaneously or successively; but if successively of course the gripping-jaws must remain in contact with the shoulder $b$ of the spoke. The spoke B is then caused to move inwardly by suitable means, preferably by the same gripping-jaws D which have not yet been released from the said spoke. In the inward movement of the spoke, carrying with it the rim, which follows to its normal position, a shoulder $b^3$ is formed thereon outside the hub, the said shoulder being formed by longitudinal compression and the lateral expansion of that portion of the spoke shown in Fig. 4 which lies between the line 1 1, the said line being the trace of a plane passing through the inner margin of the die on the end of the gripping-jaws D and the line 2 2 tangent to the hub at the margin of the mortise $a$. Simultaneous with this last-described operation a head $b^4$ is formed on the end of the spoke inside of the hub by means of the heading-tool G or other suitable mechanism. This completes the securement of one spoke and will leave the rim and hub in their proper relative position, with heads on each end of the spoke and a shoulder within the rim and without the hub. If the spoke and gripping-jaws are made to move an amount slightly in excess of the amount the rim has been sprung outwardly, then the said spoke will be put in tension, the proper degree of tension being determined by the excess of the inward movement of the spoke and gripping-jaws over the distance the rim has been sprung outwardly. All the spokes of the wheel are secured to the hub and rim in the same manner, resulting in the construction of a complete wheel, a part of which is shown in Fig. 6.

If the rim is provided with laterally-disposed inwardly-projecting peripheral flanges, as shown in Fig. 7, then it might be found convenient to have the outward movement of the spoke and rim and the inward movement and upsetting of the inner end of the spoke accomplished by separate jaws, as shown in said figure. In the use of such a rim the employment of independent jaws may be found expedient, since an extra movement of the gripping-jaws would be required to engage them with the shoulder on the spoke at a position immediately beneath the rim. This extra movement of the jaws is indicated by the dotted-line position of said jaws in Fig. 7. Such independent step for producing the inward and outward movement of the rim and spoke, if employed, would not be a departure from the spirit of this invention. Furthermore, it is not essential that a shoulder be formed upon the rim end of the spoke before it is placed in position, since this shoulder may be formed simultaneously with the outward movement of the spoke and rim and the upsetting of the head on the outer end of the spoke, providing the spoke-hole in the rim corresponds in outline to the cross-section of the spoke.

As the essence of this invention lies in the step of springing outwardly the rim to utilize the extra stock for the formation of a shoulder in the spoke, it follows that it is also immaterial whether the spoke be first secured to the rim and then sprung before forming the shoulder outside the hub or whether the spoke be first secured to the hub and then the tire sprung before forming a shoulder within and a head without the rim. This last-described method is illustrated in Fig. 8, which shows a spoke B secured to the hub A of a wheel. That portion of the rim between the supporting-blocks E is then sprung outwardly by the plungers H, the remainder of the wheel remaining stationary. This position is shown by full lines in this figure, and the sprung portion of the rim is made to lie intermediate of the upsetting-die F and the gripping-jaws D. That portion of the outer end of the spoke lying between the upsetting-head and the gripping-jaws D is then compressed longitudinally, forming the head $b^2$ outside the rim and the shoulder $b$ within the rim. The gripping-jaws D in their movement carry with them the entire wheel, so that when the head and shoulder $b^2$ and $b$ are completed on the spoke the wheel and several parts will be moved to occupy the position shown in dotted lines in this figure. This amounts to the wheel as a whole being permitted to adjust itself to normal position with the sprung segment thereof and simultaneous with such movement having a shoulder formed within the rim and a head on the end of the spoke without the rim.

What I claim as my invention, and desire to secure by Letters Patent, is—

1. In the manufacture of metal wheels, the method of uniting the several members thereof comprising a closed rim, spokes and the hub the said method consisting in securing a spoke rigidly to one of said members in springing the said rim outwardly, and in simultaneously upsetting the spoke immediately adjacent to the other one of said members an amount substantially equal to the distance the said rim has been sprung outwardly and forming upon the end of the spoke an opposing head on the opposite side of said member, substantially as described.

2. In the manufacture of metal wheels the method of connecting the spokes to a closed rim and hub consisting in securing the spoke to the said rim, in springing the rim adjacent to the spoke and the spoke in connection therewith outwardly, and in simultaneously returning the rim and spoke to their normal position, and forming by longitudinal compression of the said spoke a shoulder without the hub and a head within the hub, substantially as described.

3. The method of manufacturing metal wheels consisting in securing the spokes to a closed rim, in gripping the said spoke in positions immediately adjacent to the hub and rim, in moving the said spoke radially and outwardly and thereby springing that portion of the rim adjacent thereto outwardly, and in simultaneously returning the said spoke and rim substantially to their normal positions and upsetting on the spoke a shoulder without the hub and a head within the hub.

CHRIS BORG.

Witnesses:
M. E. HOLTON,
J. C. WARNES.